June 27, 1950

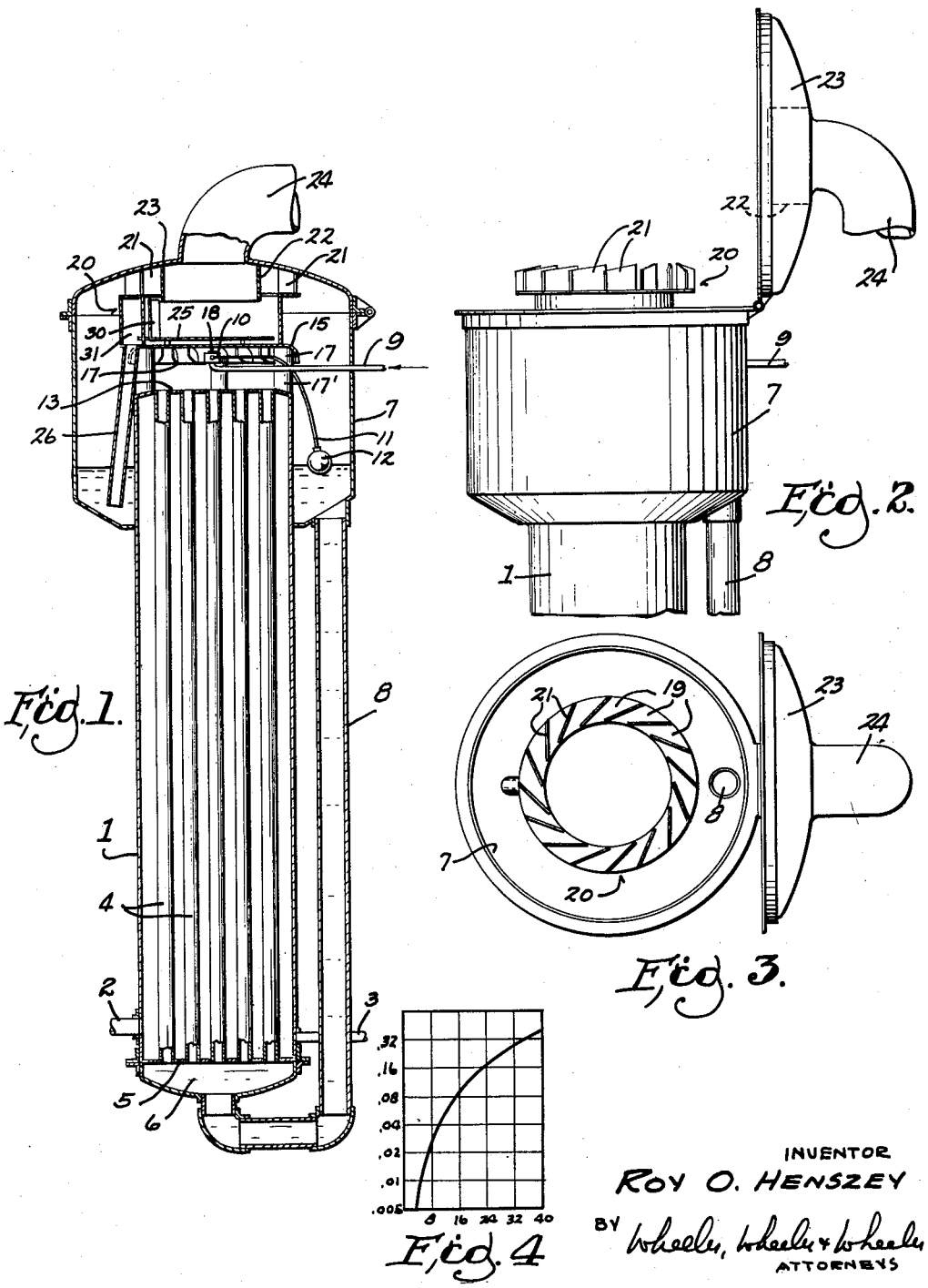

R. O. HENSZEY 2,512,938

EVAPORATOR AND SEPARATOR

Filed July 20, 1945

INVENTOR
ROY O. HENSZEY
BY Wheeler, Wheeler & Wheeler
ATTORNEYS

Patented June 27, 1950

2,512,938

UNITED STATES PATENT OFFICE 2,512,938

EVAPORATOR AND SEPARATOR

Roy O. Henszey, Oconomowoc, Wis.

Application July 20, 1945, Serial No. 606,097

11 Claims. (Cl. 159—31)

Evaporators and steam boilers generally make use of some means for separating the liquid from the steam or vapor. There are many kinds of separators, for example there are gravity, centrifugal, and baffle types. When gravity is used a very large chamber is required so that the vapor velocity will be slower in order that the force of gravity on the drop of liquid will be greater than the lifting force due to the velocity of the rising vapor. A gravity type of separating chamber, therefore will be expensive especially if it must be built of expensive materials as required for evaporators for the food industry. Furthermore, if frequent cleaning is required, the large gravity type separator will be expensive to clean.

My invention relates to an improvement in the separating means in evaporators. I make use of a centrifugal means, generally in combination with baffle and gravity means, in a novel and valuable manner, as hereinafter described.

It is the object of my invention to provide a separator, preferably combined with an evaporator and which, as compared with existing equipment for separation, is small, easy of access for cleaning, inexpensive to build and operate, and highly efficient.

In the drawings:

Fig. 1 is a view in vertical axial section through a combined evaporator and separator embodying the present invention.

Fig. 2 is a fragmentary detail view in side elevation of the apparatus shown in Fig. 1 as it appears with the cover open.

Fig. 3 is a plan view of the apparatus shown in Fig. 2.

Fig. 4 is a diagram or chart showing the relationship between vapor velocity and the diameter of spheres of water which will be carried vertically thereby.

Figure 5:
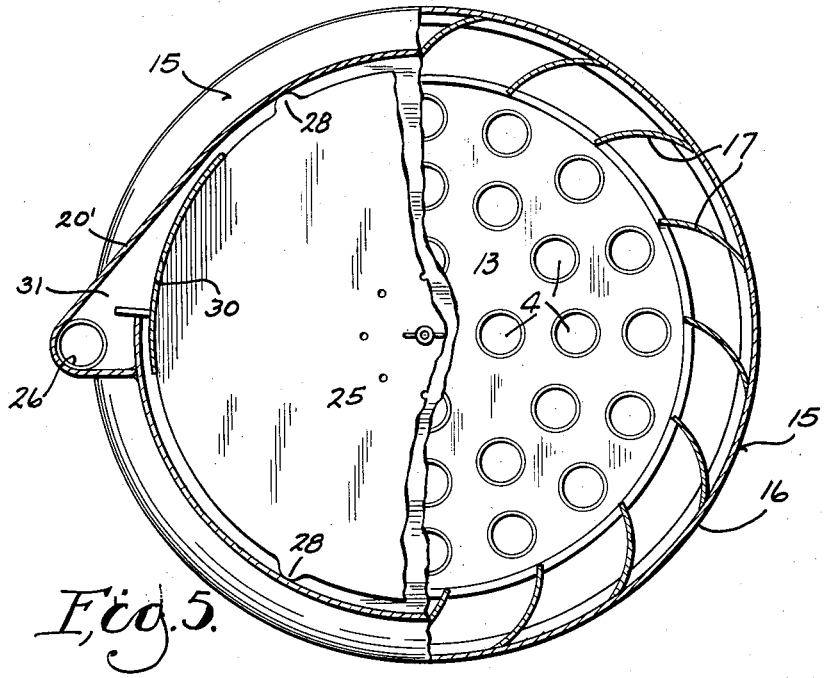
Fig. 5 is an enlarged detail view taken in section on the line 5—5 of Fig. 6.

The evaporator comprises a tubular jacket 1 into which steam or other fluid used for heating may be admitted at 2 and from which condensate may be delivered at 3.

Within the jacket 1 are tubes 4 which are preferably vertical, leading straight upward from the header 5, beneath which such tubes communicate with a chamber 6 for liquid to be evaporated.

Surrounding the upper end of the jacket 1 is the chamber 7 which communicates by means of the tube 8 with chamber 6. Liquid to be evaporated is supplied through the pipe 9 under the control of a valve 10 having an operating arm 11 provided with a float 12 resting in the pool of liquid in chamber 7 to maintain such liquid at an approximately uniform level. The tubes 4 have the liquid to be evaporated open upwardly through header 13.

Steam or vapor is generated in the liquid in the tubes 4. This lightens the mixture of liquid and vapor in tubes 4 and the unbalance of the weight of this mixture and the pressure due to the solid body of liquid in the downcomer tube 8 causes the mixture in the tubes 4 to develop considerable velocity that causes liquid as well as vapor to discharge from the top of the tubes 4 and to strike with sufficient force against the umbrella shaped baffle 15 to cause the liquid to flow against the under side of the baffle to its outer edge 16, from which the liquid is discharged in a series of streams which are delivered in a direction both downward and nearly tangential with respect to the baffle 15.

Beneath the overhanging and downwardly curved margin or edge 16 of the umbrella shaped baffle, the baffle is preferably provided with a series of vanes 17 which are encountered by the liquid as it tends to issue radially from beneath the baffle. These vanes are preferably all curved in the same direction (here illustrated as clockwise in plan). As illustrated, they have an arc of only approximately 45° but their exact arcuate extent may be varied as desired. The vanes and the overhanging margin 16 of the umbrella shaped baffle intercept and give direction to the liquid, whereby the liquid tends to be discharged in separate streams from the respective vanes at the associated edge portions of the baffle.

The vapor, being materially lighter than the liquid, changes its direction more readily and easily escapes between the isolated streams of liquid into chamber 7.

Thus, the vapor promptly moves upwardly in a clockwise whirling vortex (as viewed in Fig. 3) and proceeds toward the chamber outlet as hereinafter to be described. The very substantial momentum of the individual streams of liquid at a downward inclination and in a generally tangential direction to the walls of the chamber 7 tends to effect very substantial separation of liquid from vapor. The direction of liquid delivery is also such that the downwardly and tangentially delivered liquid strikes the surface of liquid in chamber 7, instead of being directed against the chamber wall. This beats down foam and eliminates trouble from that source. But for the tangential direction of delivery the jets of liquid might strike the chamber wall too high to fully perform this function.

The umbrella 15, by changing the vertical velocity of the liquid first into horizontal and then into downward velocity, can be conceived by making use of baffle means, centrifugal means, and gravity means, and, of course, velocity means for separation of the liquid from the vapor. The horizontal circular motion of the vapor tends to cause centrifugal separation in a horizontal plane, while the downward curve of the umbrella tends to cause centrifugal separation in a vertical plane. While the vanes 17 may be omitted in certain instances, it is preferred to use them whenever difficult separation problems are encountered.

Some liquid, however, will be carried with the vapor, as can be realized from a study of Figure 4 which shows the relative capacity of a vertically rising stream of vapor at different velocities for lifting drops of water which are otherwise under the influence of the vertical pull of gravity only. In Fig. 4 the figures at the bottom of the chart indicate velocities of vapor in units of 100 feet per minute while the ascending figures at the left indicate the diameter of spheres of water which will be lifted vertically by vapor at the velocities indicated by the curve. It is evident that the allowable velocity of the vapor may be greater, if the drops are larger, or if an additional force or velocity aids the drops of liquid in opposing the lifting force of the vapor The feed inlet pipe 9 is extended so that its outlet 18 discharges upward against the bottom of umbrella 15 and preferably near its center. The feed flashes off some vapor if the feed comes from an evaporating effect or a heater where the feed leaves at a temperature greater than that of the liquid being evaporated and fed to. Where liquid is being condensed two to one, and the total temperature drop through the evaporator's several effects is 100° F., the average flash from feed in each effect is equal to about 8% of the average vapor evaporated in each effect.

Thus it is desirable to discharge the feed under the umbrella so it can not cause a local velocity of vapor greater than the average in the vapor space around the umbrella, and thereby cause carryover at the locality of high velocity.

The vapor rises around the periphery of the umbrella 15. The horizontal cross-sectional area of this annular ring of vapor between the umbrella and the shell of the evaporator, as determined by the radial spacing of the chamber wall 7 from the umbrella baffle 15, is made of such size that the velocity of the vapor will be such as to carry only droplets smaller than a certain predetermined size. For example, in evaporators using only gravity separation the upward velocity, according to the curve in Fig. 4 must be less than 700 feet per minute if droplets carried by this vapor are to be less than .02 inch diameter. Experience shows that in evaporating milk, for example, that this velocity may cause a vapor carryover loss of about 1% of the liquid. To provide this low velocity for gravity separation alone, the separating chamber must be very large. Usually the separating chamber in gravity separation is the largest part of the evaporator, and in fact, is such a large part that it is often called the evaporator.

My invention, as explained herein, uses other means, in addition to gravity and, therefore, can allow higher velocities in the vapor than 700 feet per minute, so that the separators become a very small part of the entire evaporator. In my invention, the particles of liquid do not depend only on gravity to pull them down to the liquid level in the body 7. The liquid leaves the tubes 4 with high velocity and this is used to discharge it downward with high velocity, thereby helping the force of gravity to collect the liquid in the bottom of chamber 7.

In my invention the drops of liquid are more forcefully pulled through the stream of vapor by gravity by the aforesaid additional velocity downward, and by the aforesaid centrifugal force which throws the liquid into the foam or against the wall of the chamber far below the path of the vapor, and by the aforesaid gathering of the liquid into streams instead of delivering it in a sheet through which the vapor could not readily penetrate. The liquid in the streams, being relatively solid, is not readily broken into drops and entrained by the vapor. Liquid striking the wall runs down more easily as it is not so easily lifted by the vapor. It is evident, therefore, that the size of the separating chamber can be considerably reduced if the liquid is separated from the vapor by means other than, or in addition to, gravity. It is also evident that the first separating chamber may be smaller if the vapor is to be passed afterward through another separator.

The vapor leaving the annular ring aforementioned then rises in vortex rotation to the inlets 19 of the centrifugal separator 20, which are arranged to cause a rotary motion of the vapors in the separator 20, which is round in its horizontal cross-section. The inlets are preferably formed as shown by the vanes 21 which are arranged in annular series at the top outer periphery of the separator and obliquely respecting radii of the separator shell. Since the vanes 21 preferably have a pitch in the same direction as the pitch of the blades 17, the whirling vapor rising in chamber 7 will tend to pass the inlets 19 and are forced to reverse their direction of whirling movement in order to enter, thus further tending to discharge entrained droplets of liquid. The fluids entering the separator and whirling counterclockwise, as viewed in Fig. 3, are centrifugally thrown against the periphery of the separator 20 causing the vapor to rotate and to throw the suspended drops of moisture outward and downward against the walls of the separator. Centrifugal force holds the vapor and moisture to the separator wall where the direction of flow is downward and circumferential.

Figure 6:
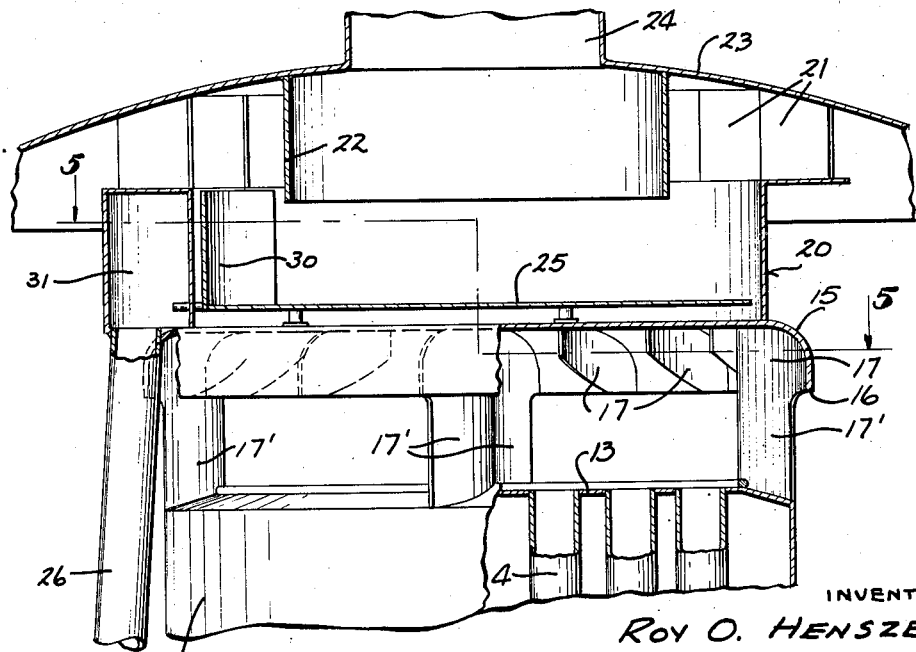
Fig. 6 is an enlarged detail view partly in side elevation and partly in vertical axial section showing the separating mechanism.

A baffle ring 22, which may be suspended from cover 23, is preferably used to insure that the vapor flow into separator 20 must be downward as well as tangential. Friction of the vapor on the separator wall causes the vapor to rotate more slowly as it descends so that the lower layer of vapor has less centrifugal force and moves readily toward the center of the separator where the direction of least resistance is upward to the vapor outlet 24. Drops of liquid, being much heavier than the vapor, tend to continue to rotate around the inside of the shell or under the false bottom 25 until they are discharged through outlet chamber 31 to the liquid outlet pipe 26 which opens from the bottom of the periphery of the separator and preferably discharges below liquid level in chamber 7. As best shown in Fig. 5 and Fig. 6, the false bottom 25 is spaced marginally from the separator wall by spacing projections 28 sufficiently to pass liquid while turning upwardly the vapor nearer the center. The vapor leaving through the vapor outlet 24 is, therefore, practically free of liquid.

To aid in separating the liquid from the vapor, an arcuate skimmer 30 of slightly less radius than shell 20 spans a liquid outlet chamber 31 formed by the substantially tangentially divergent portion 20' of the shell wall. Since the said tangential wall portion 20' and the skimmer 30 diverge in the direction of flow, the velocity of the vapor in the outlet chamber 31 decreases as the cross-section increases. The friction of the vapor against the liquid film also decreases so that the liquid flowing along the wall of shell 20 and passing outside of skimmer 30 falls to the bottom of chamber 31. Any liquid flowing along the wall that passes below the level of the false bottom also escapes beneath skimmer 30 to the outlet chamber 31. As soon as the liquid passes below the false bottom, it can not easily be lifted again by the friction of the vapor.

In some cases, the separator 20, 21, 22, 25, 26, 30, 31 may be omitted, my improved centrifugal form of umbrella alone being sufficient to cause the desired degree of separation by supplementing the effect of gravity.

The preferred form of the separating apparatus uses the bottom of the centrifugal separator as a substantial part of the umbrella, thereby making the device lighter, more compact and easier to clean. The assembly is preferably unitary, the baffle 17 being mounted to the under surface of the umbrella, and the shell 20, false bottom 25, chamber 31 and vanes 21 being assembled above the umbrella.

The preferred arrangement uses the removable cover 23 of the evaporator for the top of the centrifugal separator as well, so that when the evaporator is opened the top of the complete separating device is open also. In this preferred arrangement as illustrated, the opening of cover exposes the tangential inlets of the centrifugal separator for inspection and cleaning. With the cover open and the separator assembly removed, the entire inside part of the evaporator is exposed for cleaning and is of such dimension as to be entirely accessible without the necessity of a person getting inside. This is a very important feature.

The cover is preferably made large enough so that the entire separating device including the centrifugal separator and the umbrella separator may be lifted unitarily completely out of the evaporator for cleaning or other purposes. Legs, which may comprise extensions 17' of some of the curved blades or baffles 17 may support the entire unitary separator assembly from the beveled margin of header 13 to facilitate unitary handling as above described. When the evaporator cover 23 is closed as shown in Figs. 1 and 6, it will substantially contact the upper margins of the vanes 21 and, consequently, will serve to hold the unitary separator assembly in position on the top of the evaporator header 13.

By means of this invention I have been able to reduce the evaporation or separation chamber 7 to such size as is convenient to hold only the separator, a float and a small amount of the liquid being evaporated. The diameter is about one half, and the height one quarter the dimensions of separators used with most common evaporators, yet the separation is better. Tests, when evaporating a solution containing 50,000 parts per million of salt, showed only three parts per million in the condensed vapor.

I claim:

1. In a device of the character described, a centrifugal separator comprising a shell of generally circular cross section, and having an inlet at its top in the vicinity of its periphery and a central top outlet for vapor, vanes in annular series about said shell in the path of vapor entering said inlet and pitched to impart a whirling movement to vapor entering the shell.

2. The device set forth in claim 1 in which said shell has a peripheral skimming outlet for liquid centrifugally separated from vapor therein.

3. In an evaporator, the combination with a fluid reservoir and separating chamber provided with a removable cover, of a centrifugal separator within said chamber for which said cover constitutes a top, said separator having a support independent of the cover, the separator comprising a shell of generally circular cross section, and inlet vanes above the shell and disposed in annular series and obliquely positioned respecting radii of said shell, the spaces between such vanes comprising generally tangential inlets to the separator for which said cover constitutes a closure, the vanes being substantially equal in height to the vertical distance between the closed cover and the separator shell whereby the closed cover positions the separator and holds it against substantial displacement.

4. In a device of the character described, the combination with a centrifugal separator shell provided with substantially tangential fluid inlet means for inducing fluid rotation in the shell, of a false bottom having marginal portions spaced slightly from said shell, means providing a central gaseous outlet from said shell, and means providing a liquid outlet from a portion of said shell below said false bottom whereby liquid penetrating below said false bottom may escape through said liquid outlet without entrainment by gases rotating in said shell above said bottom.

5. A centrifugal separator comprising a shell of generally circular cross section having a tangentially divergent wall portion, an arcuate baffle spanning said divergent wall portion and of slightly less radius than said shell whereby to constitute a skimmer tending to hold gases within said shell while permitting liquid circulating in said shell to follow said divergent wall portion, tangential inlet means for said shell so disposed as to establish whirling motion of fluids admitted to the shell in a direction to direct fluids across said skimmer baffle, said tangentially divergent wall portion and baffle providing a chamber outside said baffle of progressively enlarging cross section, and means providing a liquid outlet from said chamber and said shell.

6. The combination with an evaporator comprising a jacket and top and bottom headers, of tubes extending upwardly between said headers and opening through the top header, an annular chamber surrounding the upper end of the jacket, a downcomer tube leading from the annular chamber to the lower ends of said tubes, a feed supply line terminating above the top header and provided with a float controlled inlet valve having a float in said chamber for determining liquid level therein, a baffle spanning the upper ends of said tubes and said feed inlet and provided with downwardly curved margins for directing tangentially and downwardly toward the level of the liquid of said chamber any liquid intercepted by said baffle, vanes disposed about the downwardly turned margin of said baffle, and obliquely pitched to intercept and deliver in generally tangential streams the liquid directed downwardly from said margin, a centrifugal separator shell mounted on the baffle, the baffle constituting a bottom therefor, a false bottom within said shell comprising a disk having means supporting it above said baffle, said disk being marginally spaced slightly from said shell, the shell being of generally circular form and having a generally tangentially divergent wall portion, an arcuate partition spanning said tangential wall portion and slightly spaced within said shell whereby to constitute a skimmer between which and said tangential wall portion is a discharge chamber of progressively increasing cross-section, a drain pipe leading from said chamber toward the bottom of the evaporator chamber aforesaid, the space below said false bottom communicating with said drain pipe, obliquely disposed vanes mounted on said shell and affording generally tangential inlet openings leading thereto, and a cover for said evaporator chamber comprising a closure for said shell fitted substantially to the vanes last mentioned and provided with a centrally disposed gaseous outlet from said shell.

7. In an evaporator storage chamber having a removable cover, a plurality of mechanical separating devices connected in sequence and comprising a unitary assembly bodily removable from said chamber when said cover is open, one of said devices having an open top for which said cover constitutes a closure.

8. A separator comprising a substantially cylindrically walled shell having a tangential discharge passage opening from one side, an arcuate skimming baffle spanning said passage and marginally spaced inwardly from substantially cylindrical wall portions of said shell, and a false bottom peripherally spaced from said shell and below which there is a space enclosed by said shell and opening into said discharge passage, said baffle being disposed above said false bottom.

9. In an evaporator or the like, the combination with an umbrella baffle, of a centrifugal separator for which said baffle constitutes a bottom, said separator comprising a substantially cylindrical shell rising above said umbrella baffle and having a tangential discharge passage opening from one side thereof, a false bottom mounted upon and spaced above said umbrella baffle and marginally spaced within said shell, and an arcuate skimming baffle spanning the discharge passage and having its ends closely spaced inwardly from substantially cylindrical portions of said shell.

10. The combination set forth in claim 9, in further combination with a removable evaporator closure, also constituting a closure for said separator, and helically pitched baffles mounted on said shell and extending in close proximity to the closure to be exposed upon removal of the closure.

11. The combination set forth in claim 9, in further combination with a removable evaporator closure, also constituting a closure for said separator, helically pitched baffles mounted on said shell and extending in close proximity to the closure to be exposed upon removal of the closure, said closure having an outlet port, and a sleeve depending from the closure and disposed inside of said helically pitched inlet baffles and downwardly into said shell.

ROY O. HENSZEY.

REFERENCES CITED

The following references are of record in the file of this patent:

UNITED STATES PATENTS

| Number | Name | Date |
| --- | --- | --- |
| 890,227 | Goss | June 9, 1908 |
| 1,182,220 | Seeger | May 9, 1916 |
| 1,213,596 | Debaufre | Jan. 23, 1917 |
| 1,298,925 | Garrigues | Apr. 1, 1919 |
| 1,528,104 | Ewart et al. | Mar. 3, 1925 |
| 1,562,713 | Miles | Nov. 24, 1925 |
| 1,622,643 | Hawley | Mar. 29, 1927 |
| 1,684,022 | Hawley | Sept. 11, 1928 |
| 1,723,034 | Hawley | Aug. 6, 1929 |
| 1,760,351 | Evans | May 27, 1930 |
| 1,783,813 | Schneible | Dec. 2, 1930 |
| 1,884,726 | Kermer | Oct. 25, 1932 |
| 1,950,285 | Battle et al. | Mar. 6, 1934 |
| 2,040,284 | Tell | May 12, 1936 |
| 2,059,521 | Hawley | Nov. 3, 1936 |
| 2,103,521 | Luly | Dec. 28, 1937 |
| 2,121,999 | Trepaud | June 28, 1938 |

FOREIGN PATENTS

| Number | Country | Date |
| --- | --- | --- |
| 457,784 | Germany | Jan. 30, 1926 |